Nov. 21, 1950  F. W. BENEDICT  2,530,594
SEPARATING SOLID MATTER FROM HOT WORT
Filed Feb. 4, 1948  3 Sheets-Sheet 1
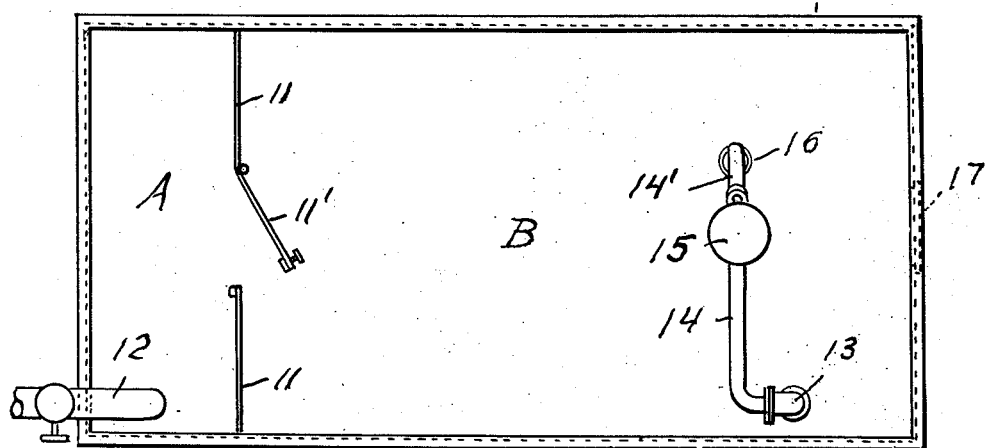
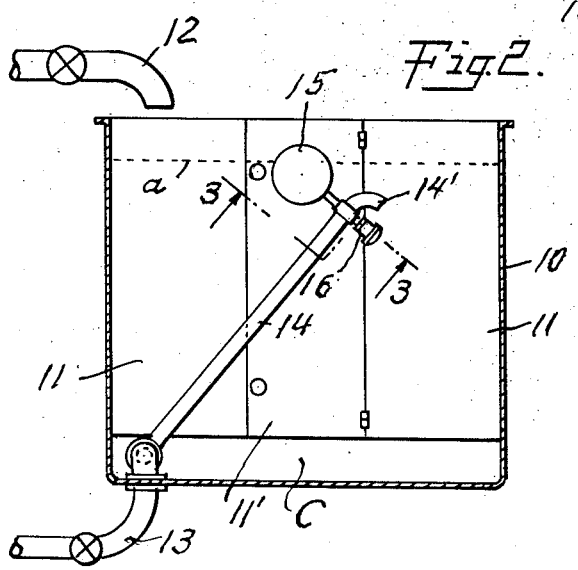
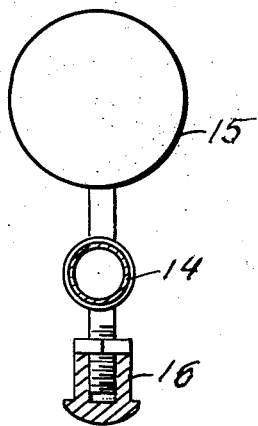
INVENTOR
Fremont W. Benedict,
BY
Pennie, Edmonds, Morton, Barrows
ATTORNEYS Nov. 21, 1950  F. W. BENEDICT  2,530,594
SEPARATING SOLID MATTER FROM HOT WORT
Filed Feb. 4, 1948  3 Sheets-Sheet 2
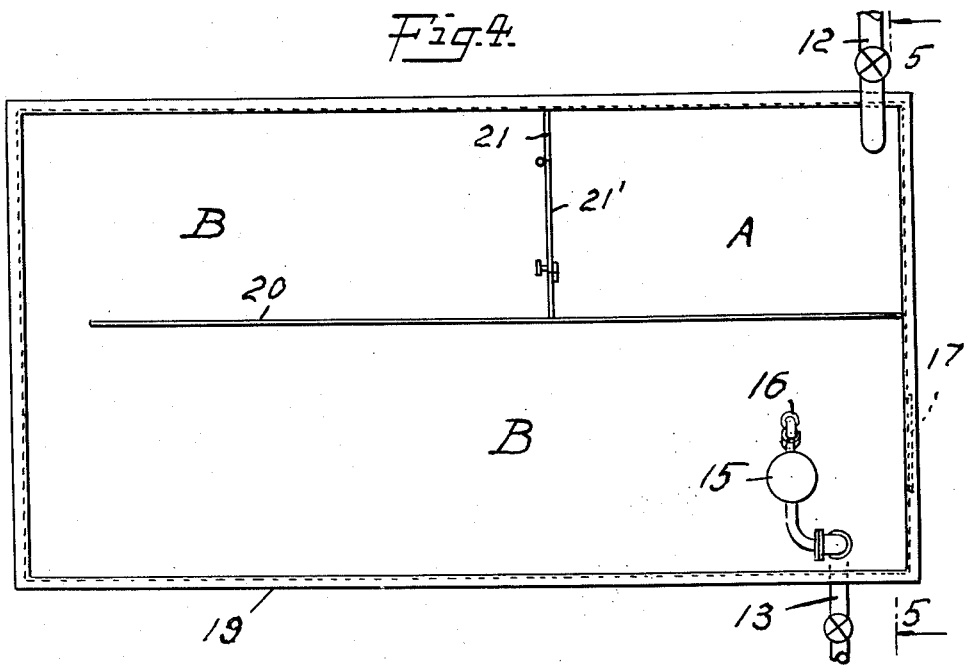
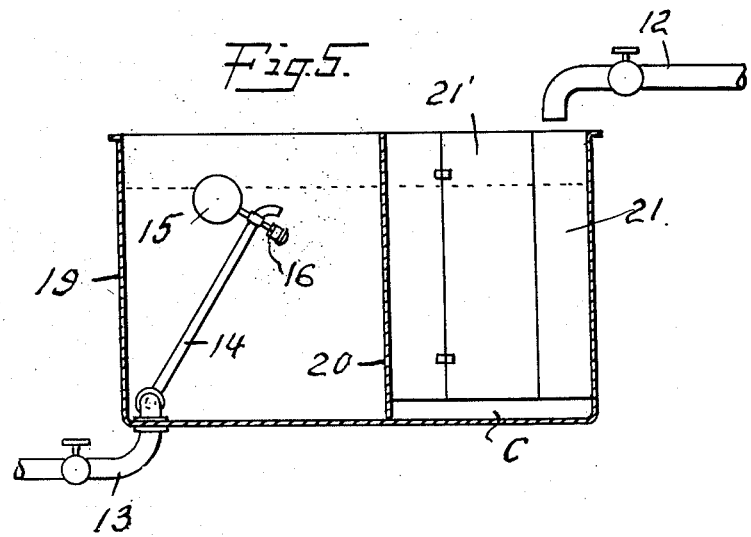
INVENTOR
Fremont W. Benedict,
BY
Pennie, Edmonds, Morton & Barrows
ATTORNEYS Nov. 21, 1950   F. W. BENEDICT   2,530,594
SEPARATING SOLID MATTER FROM HOT WORT
Filed Feb. 4, 1948   3 Sheets-Sheet 3
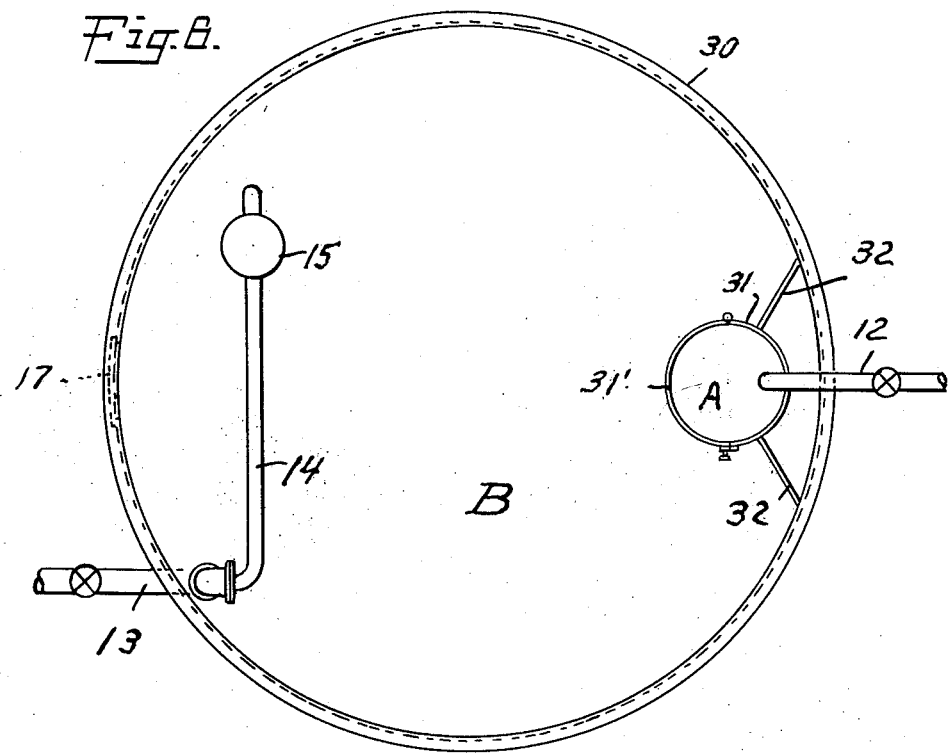
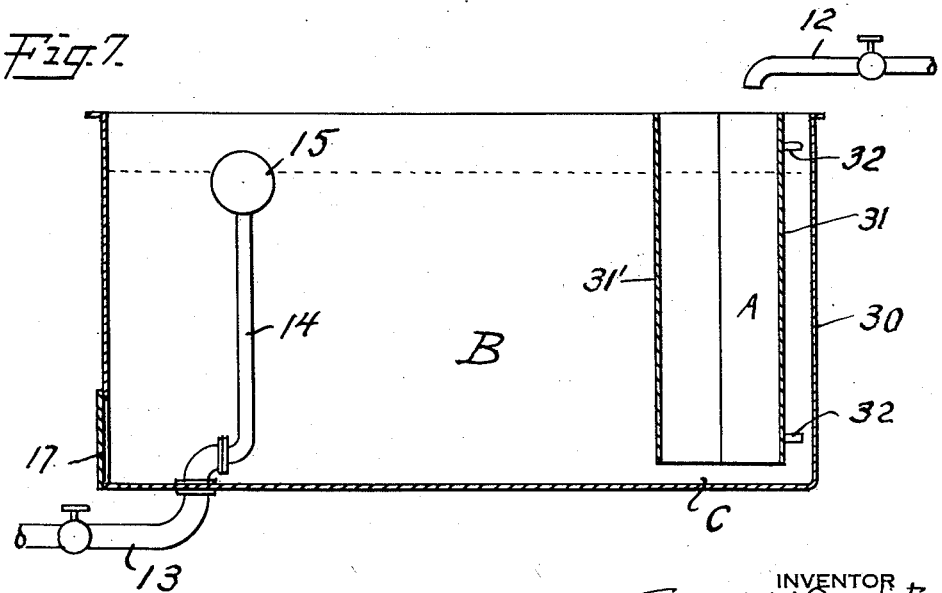
INVENTOR
Fremont W. Benedict
BY
Pennie, Edmonds, Morton & Barrows
ATTORNEYS Patented Nov. 21, 1950

2,530,594

UNITED STATES PATENT OFFICE 2,530,594

SEPARATING SOLID MATTER FROM HOT WORT

Fremont W. Benedict, Upper Darby, Pa., assignor to F. W. Benedict, Emily Benedict, E. W. Hipp, and Eve Hipp, copartners trading under the name of Bruell Products Company, Philadelphia, Pa.

Application February 4, 1948, Serial No. 6,267

3 Claims. (Cl. 210—54)

1

This invention relates to the sedimentation of solid matter from hot wort in the brewing industry. The invention aims to provide an improved method of and apparatus for separating solid matter from hot wort.

In the brewing of beer, the hot wort is conducted from the hop separator to tanks in which some sedimentation of solid matter takes place as well as some cooling. From the hot wort tanks, the wort passes through coolers to the starting tanks. Due to the present day large production of beer, greatly in excess of that for which the usual equipment was originally designed and intended, the wort is flowed through the hot wort tanks without an adequate detention period for sedimenting the solid matter or trub as it is termed in the brewing art. The excessive amount of trub, due to inadequate sedimentation, increases the amount of sludge in the starting tanks, and the frequent periodic removal of this sludge involves a considerable loss of beer.

The present invention aims to effect a separation from the hot wort of most of the nitrogenous substances and hop resins prior to the delivery of the wort to the coolers and starters. The method of the invention involves introducing the hot wort into a charging zone where the wort is under some turbulence and from whence it flows into an adjacent and substantially larger quiescent zone. The communication between the two zones is well below the liquid level, and substantially clear wort is withdrawn from the quiescent zone near the liquid level and at a point as remote as practical from the charging zone. The apparatus of the invention comprises a tank of any desired configuration having a partition dividing the tank into a charging or feeding compartment and a settling compartment of considerably larger volume than the charging compartment. The lower end of the partition is spaced a short distance above the bottom of the tank, and the space between the partition and the tank bottom provides the communication between the two compartments. The hot wort is preferably delivered in a stream above the liquid level, so that it splashes into the wort in the charging compartment and keeps the wort there in agitation. A float-controlled discharge is provided for withdrawing substantially clear wort from near the liquid level of the settling compartment at a point remote from the partition.

The foregoing and other novel features of the invention will be best understood from the following description taken in conjunction with the accompanying drawings, in which Fig. 1 is a top plan of a rectangular hot wort tank embodying the invention, Fig. 2 is a sectional elevation on the section line 2—2 of Fig. 1, Fig. 3 is a detail view of the float-controlled discharge taken on the section line 3—3 of Fig. 2, Fig. 4 is a top plan of a modified form of rectangular tank embodying the invention, Fig. 5 is a sectional elevation on the section line 5—5 of Fig. 4, Fig. 6 is a top plan of a circular hot wort tank embodying the invention, and Fig. 7 is a sectional elevation of the tank of Fig. 6.

The invention may be applied to hot wort tanks of any size or shape. As presently installed these tanks are designed to receive the hot wort from one or more brew kettles, and hence the tank capacity depends on the size of the brew, varying from 2000 gallons, in the case of a small brewery, up to 30,000 gallons or more, in the case of the larger breweries. It has heretofore been the custom to clean out the tanks after each brew. The practice of the invention, however, permits 2 to 3, and sometimes more, brews to be continuously introduced into the hot wort tank without emptying and cleaning the tank. The invention may be readily applied to existing tanks, and results in improved clarification of the hot wort, more rapid sedimentation of solid matter, and increased hot wort tank capacity for the same size brew.

In Figs. 1, 2 and 3 the invention is shown embodied in a rectangular tank 10. The tank is provided with a transverse partition 11 extending from the top to within a short distance of the bottom, and dividing the tank into a charging or feeding compartment A and a settling compartment B. The space C between the lower end of the partition and the tank bottom provides the communication between the two compartments well below the maximum liquid level $a$ in the tank. The settling compartment has several times the volume of the charging compartment. For example in a medium-sized tank 25 feet long, the partition 11 may be positioned 3–5 feet from one end of the tank. In such a tank about 10 feet deep, the partition may extend to within about 12 inches of the tank bottom. The partition has a hinged door 11' which in the normal settling operation of the tank is securely closed. The purpose of the door is to permit free access between the two compartments A and B when the tank is emptied and being cleaned. A normally-closed clean-out opening or manhole 17 is provided at the bottom of the end wall of the settling compartment of the tank.

The hot wort is introduced into the charging compartment A through a valved delivery pipe 12. The discharge end of this pipe is preferably positioned above the liquid level in the tank, so that the entering stream of hot wort splashes into the wort in the charging compartment to agitate it and cause such a state of turbulence that the solids are kept in suspension. The bottom of the settling compartment has a valved outlet 13 approximate the end of the tank remote from the partition. A pipe 14 has a swiveled and liquid-tight connection with the outlet 13, and is thus adapted to be moved so that its goose-neck inlet 14' may be positioned at any height within the tank. A float 15 is operatively connected to the pipe 14 near its inlet, and is adapted to hold the inlet 14' of the pipe just beneath the liquid level in the tank, irrespective of what that level may be. The pipe 14 is provided with an adjustable foot 16 adapted to hold the inlet 14' just above the sludge level in the tank in the last stage of emptying the tank.

In practicing the invention in the apparatus of Figs. 1, 2 and 3, the hot wort from the hop separator is introduced into the charging compartment A through the delivery pipe 12. When the tank is about full, say with the liquid level at about a, the valve of the discharge pipe 13 is opened, and substantially clear wort is withdrawn by decantation from near the liquid level in the compartment B and at a point remote from the compartment A. A state of gentle turbulence is maintained in the compartment A which keeps the solids in suspension and also promotes flocculation of fine solids into aggregates or flocs of increased size and faster settling quality. The wort with its thus-flocculated solid matter flows gently into the compartment B well below the liquid level and thus causes a minimum disturbance of the desired quiescence of the wort in compartment B. Due to the quiescent state of the wort in the compartment B, the solids settle rapidly and very completely, so that at the far or remote end of the compartment the wort near the liquid level is substantially clear. With the tank filled to the liquid level a, the introduction of hot wort and the withdrawal of substantially clear wort may proceed in a continuous manner, one brew being pumped into the tank on top of another while withdrawing at all times a clear effluent. The optimum operation results by maintaining the rate of wort flow through the tank slower than the settling rate of the solid matter. When it becomes necessary to clean out the tank, say after 3 or more brews, the introduction of hot wort is stopped, and the pipe 14 is permitted to gradually swing downwardly about its swivel connection with the outlet 13 until the foot 16 rests on the bottom of the tank, the float 15 holding the inlet 14' just below the liquid level as that level gradually falls in the emptying of the tank. The sludge or trub is then discharged through the manhole 17. Whenever it becomes desirable to thoroughly clean the tank, after the discharge of the sludge, the door 11' is opened, and the sides and bottom of the tank are hosed-down or scraped, and the wash liquid discharged through the manhole 17.

The tank of Figs. 4 and 5 is constructed to permit the discharge of the conventional hop separator directly into the charging compartment A of the tank. The tank 19 has a longitudinal partition 20 the full depth of the tank and extending from the feed end of the tank to within a short distance, say 2 feet, of the other end. A transverse partition 21 divides the tank into the charging compartment A and the settling compartment B, communicating with one another through the space C between the lower end of the partition 21 and the tank bottom. Like the partition 11, the partition 21 extends from the top of the tank downwardly to within a short distance of the bottom of the tank, and has a clean-out door 21'. The valved outlet 13, pipe 14, float 15, foot 16 and clean-out manhole 17 are of the same construction as in the tank of Figs. 1, 2 and 3. The longitudinal partition 20 increases the length of the path of flow of the wort through the quiescent compartment B and to some extent this promotes settling of the solids. The hop separator may be positioned directly above the charging compartment A, in order to discharge directly into the compartment. Hot wort may be introduced into the charging compartment through the delivery pipe 12, rather than from the hop separator, if desired.

The circular tank 30 of Figs. 6 and 7 has near one side a cylindrical charging or feeding well 31 which extends from the top of the tank to within a short distance of the bottom. Like the partitions 11 and 21, the cylinder 31 divides the tank into a charging compartment A and a quiescent compartment B communicating through the space C between the lower end of the cylinder and the tank bottom. The cylinder 31 is secured to the tank by stays 32, and has a hinged door 31' corresponding to the doors 11' and 21'. The clean-out manhole 17 is in the bottom of the tank wall opposite the cylinder 31. The outlet 13 is in the bottom of the tank opposite the cylinder 31. The float-controlled pipe 14 is connected to the outlet as hereinbefore described.

The tanks of Figs. 4 and 5 and Figs. 6 and 7 are used in the practice of the invention in the same manner as hereinbefore described in connection with Figs. 1, 2 and 3. The hot wort, generally at approximately the boiling temperature, say between 200 and 212° F., is introduced into the charging compartment so as to keep the wort therein in a state of agitation. This agitation accompanied by some cooling tends to flocculate the finely divided nitrogenous and other solid matter and expedites the "hot break" or sedimentation of solids in the settling compartment. The wort in the settling compartment is comparatively quiescent and settling proceeds in a highly efficient manner. The settling compartment or zone of quiescence should be as large as practical, and the charging compartment or zone of turbulence should be relatively small. Substantially all of the sludge or trub is removed from the wort in the settling compartment, and substantially clear wort is delivered through the outlet 13 to the coolers and starting tanks.

I claim:

1. The improvement in separating finely-divided solid matter from hot wort which comprises introducing the hot wort into a confined zone, maintaining the wort in the confined zone in a state of turbulence to keep solids therein in suspension for a length of time sufficient to permit flocculation of finely-divided solid particles into aggregates or flocs of increased size and faster settling quality, passing the wort containing the aggregates or flocs from the bottom of the zone of turbulence into the bottom of an adjacent quiescent zone of substantially greater volume than the zone of turbulence, and withdrawing substantially clear wort from near the surface of said quiescent zone at a point remote from where the wort passes into that zone from the zone of turbulence.

2. The improvement in separating finely-divided solid matter from hot wort as defined in claim 1 in which the hot wort is passed substantially continuously through the turbulent and quiescent zones.

3. The improvement in separating finely-divided solid matter from hot wort as defined in claim 1 in which the hot wort is introduced into the turbulent zone in such manner as to maintain the wort therein in a state of turbulence.

FREMONT W. BENEDICT.

REFERENCES CITED

The following references are of record in the file of this patent:

UNITED STATES PATENTS

| Number | Name | Date |
| --- | --- | --- |
| 1,203,578 | Brooks | Nov. 7, 1916 |
| 1,652,036 | McKesson | Dec. 6, 1927 |
| 1,672,583 | Travers | June 5, 1928 |
| 2,229,875 | Schwartz et al. | Jan. 28, 1941 |

FOREIGN PATENTS

| Number | Country | Date |
| --- | --- | --- |
| 165,378 | Great Britain | June 30, 1921 |
| 787,366 | France | Apr. 18, 1905 |
| 787,367 | France | Apr. 18, 1905 |
| 54,983 | Germany | Jan. 12, 1891 |
| 190,778 | Germany | Nov. 9, 1907 |
| 200,570 | Germany | July 22, 1908 |
| 91,236 | Austria | Feb. 10, 1923 |